(12) United States Patent
Rao et al.

(10) Patent No.: US 6,721,448 B2
(45) Date of Patent: Apr. 13, 2004

(54) COLOR CLUSTERING AND SEGMENTATION USING SIGMA FILTERING

(75) Inventors: Ravishankar Rao, White Plains, NY (US); Kuo Chung-Hui, Minneapolis, MN (US); Gerhard R. Thompson, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 09/785,397

(22) Filed: Feb. 20, 2001

(65) Prior Publication Data

US 2002/0114512 A1 Aug. 22, 2002

(51) Int. Cl.$^7$ ................................. G06K 9/00
(52) U.S. Cl. ...................... 382/164; 382/260
(58) Field of Search ................ 382/162–167, 382/173–180, 260–265; 358/500–540

(56) References Cited

U.S. PATENT DOCUMENTS

| 6,381,363 B1 | * | 4/2002 | Murching et al. | 382/164 |
| 6,385,337 B1 | * | 5/2002 | Klassen | 382/166 |
| 6,546,130 B1 | * | 4/2003 | Inoue et al. | 382/162 |

OTHER PUBLICATIONS

Kuo "Sigma filter based unsupervised color image segmentation" Proc. 2000 IEEE International Conference on Acoustic, Speech, and Signal processing, vol. 4, p. 2235–38, Jun. 2000.*
Pattern Recognition, by S. Theodoridis and K. Koutroumbas, Academic Press, 1999, pp. 387–392.
Pattern Recognition by S. Theodoridis and K. Koutroumbas, Academic Press, 1999, pp. 497–502.
Algorithms for Clustering Data, by A.K. Jain and R. C. Dubes, Prentice Hall, 1988, pp. 120–124.
Robot Vision, by B. K. P. Horn, MIT Press, 1986, pp. 65–71.

* cited by examiner

*Primary Examiner*—Jingge Wu
(74) *Attorney, Agent, or Firm*—Whitham, Curtis & Christofferson, P.C.; Stephen C. Kaufman

(57) ABSTRACT

A color clustering and segmentation method retains edge. A sigma filter is applied to an input image to generate a smoothed image. The filtered image is divided into a plurality of non-overlapping windows. A sequential clustering algorithm is applied to filtered pixels of each window to generate potential clusters. Generated potential clusters are validated while clusters representing pixels on boundaries are rejected. The result is a generated list of cluster centroids in a chosen color space.

7 Claims, 9 Drawing Sheets

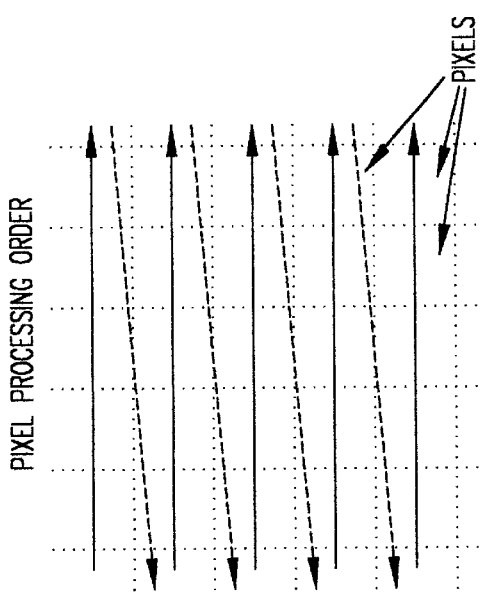
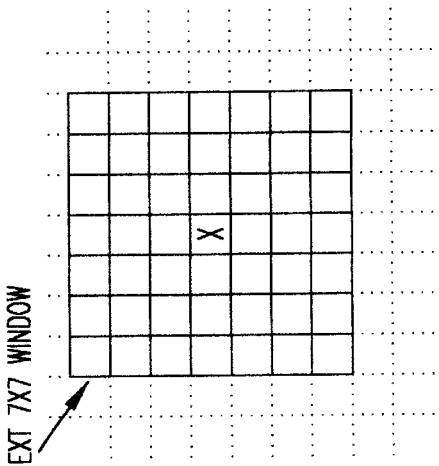
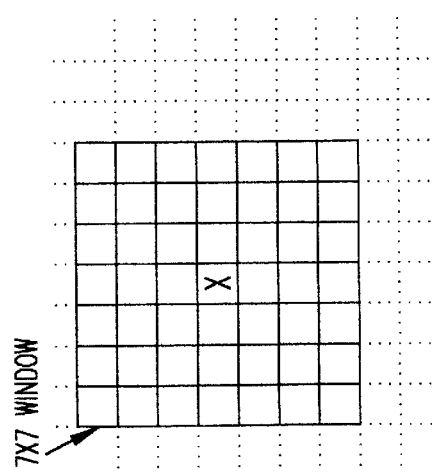

| 0.0011 | 0.0035 | 0.0072 | 0.0091 | 0.0072 | 0.0035 | 0.0011 |
| 0.0035 | 0.0115 | 0.0237 | 0.0301 | 0.0237 | 0.0115 | 0.0035 |
| 0.0072 | 0.0237 | 0.0485 | 0.0616 | 0.0485 | 0.0237 | 0.0072 |
| 0.0091 | 0.0301 | 0.0616 | 0.0782 | 0.0616 | 0.0301 | 0.0091 |
| 0.0072 | 0.0237 | 0.0485 | 0.0616 | 0.0485 | 0.0237 | 0.0072 |
| 0.0035 | 0.0115 | 0.0237 | 0.0301 | 0.0237 | 0.0115 | 0.0035 |
| 0.0011 | 0.0035 | 0.0072 | 0.0091 | 0.0072 | 0.0035 | 0.0011 |
| 0.0327 | 0.1075 | 0.2204 | 0.2798 | 0.2204 | 0.1075 | 0.0327 |

FIG. 6

COLOR CLUSTERING AND SEGMENTATION USING SIGMA FILTERING

BACKGROUND OF THE INVENTION

1. Field of the Invention

The present invention generally relates to document image analysis and, more particularly, to color clustering and segmentation using sigma filtering and a fast sequential clustering algorithm.

2. Background Description

In many applications, such as document image analysis and analysis of digital images, an important processing stage is that of segmentation of the image into regions of near-uniform color. The results of this stage are used for further analysis, such as a determination of the number of colors present in the image, identification of regions with specific color and an analysis of geometric features of regions with uniform color. One of the uses of such segmentation is to decide what compression algorithm to use, based on the content of different regions of the image. Regions with two colors can be more efficiently compressed with bi-level algorithms, regions with a few colors can be compressed with palettized colors, and regions with a large number of colors can be compressed with techniques like the JPEG (Joint Photographic Experts Group) compression algorithm.

Making such a determination in an adaptive manner is a challenging problem due to the many sources of noise that exist in imaging systems. Due to this noise, regions that should have uniform color are broken up into several smaller regions with varying color. Furthermore, the number of colors present in an image is not known a priori. This makes it difficult to adapt a clustering or classification technique to such a situation.

One of the methods used has been to smooth the image prior to clustering, so that some of the noise is removed. However, this has the problem that valid image features, such as character edges, also get smoothed, resulting in a loss of detail.

SUMMARY OF THE INVENTION

It is therefore an object of the present invention to provide an improved method of image segmentation which is both fast and retains edge information.

According to the invention, there is provided a technique, based on sigma filtering, to achieve compact color clusters. The idea is to smooth only between the edges, while leaving edge information intact. In addition, a fast sequential clustering algorithm which uses parameters estimated during the sigma filtering operation is used. The advantage of the sequential clustering algorithm is that it is much faster than other techniques reported in the literature which are iterative.

The results of applying these techniques to color clustering are very beneficial, and result in images being segmented easily and with precision. These results can also be used for applications like optical character recognition where accurate segmentation of the text from background is important.

BRIEF DESCRIPTION OF THE DRAWINGS

The foregoing and other objects, aspects and advantages will be better understood from the following detailed description of a preferred embodiment of the invention with reference to the drawings, in which:

FIG. 3A is a raster diagram showing the order of processing pixels in the original image, and FIGS. 3B and 3C diagrams showing an 7×7 window moved from one pixel to the next in raster order;

FIG. 6 is a table of Gaussian filter coefficients;

DETAILED DESCRIPTION OF A PREFERRED EMBODIMENT OF THE INVENTION

The problem that we wish to solve in this invention is to segment a color image into areas of near-uniform color. In other words, regions that have approximately the same color will be identified with a common label. More formally, if we are given a set of N labels $L=\{l_1, l_2, \ldots, l_N\}$, the objective of segmentation is to assign a unique label $l_i$, to every pixel in the image. For instance if the image contains two types of regions, say the foreground (text) and background, then, we can assign the label $l_1=1$ to a pixel to denote that it belongs to the foreground and $l_2=0$ to denote that the pixel belongs to the background.

The usual method used in the literature is to perform cluster analysis where the number of clusters is specified in advance. For instance, in the case of images involving only text and background, we know in advance that there are exactly two labels are required for the segmentation. Furthermore, popular methods for segmentation use training data, where sample pixels belonging to known clusters (foreground or background) are used to train the cluster analysis procedure.

However, in the problem we are solving in this invention, the number of clusters is not pre-specified. This is because we choose not to make assumptions about the type of input presented to the system. In fact, one of the goals of our analysis is to determine how many clusters are present. Furthermore, we do not make use of training data as the input images can be created from a variety of sources. This way, our algorithm is applicable to a wider variety of images.

Another factor that we need to consider in practical usage is the fact that images acquired from a scanner will be corrupted with noise, which may be introduced by the scanner or the printing process, which may smear ink on the paper. This results in regions that should have uniform color actually possessing multiple colors. This phenomenon is illustrated FIG. 7, where we see multiple colors present in a region that should have only three colors. These multiple colors are caused by the interactions between ink and paper and also by the introduction of noise during the scanning process.

Figure 1:
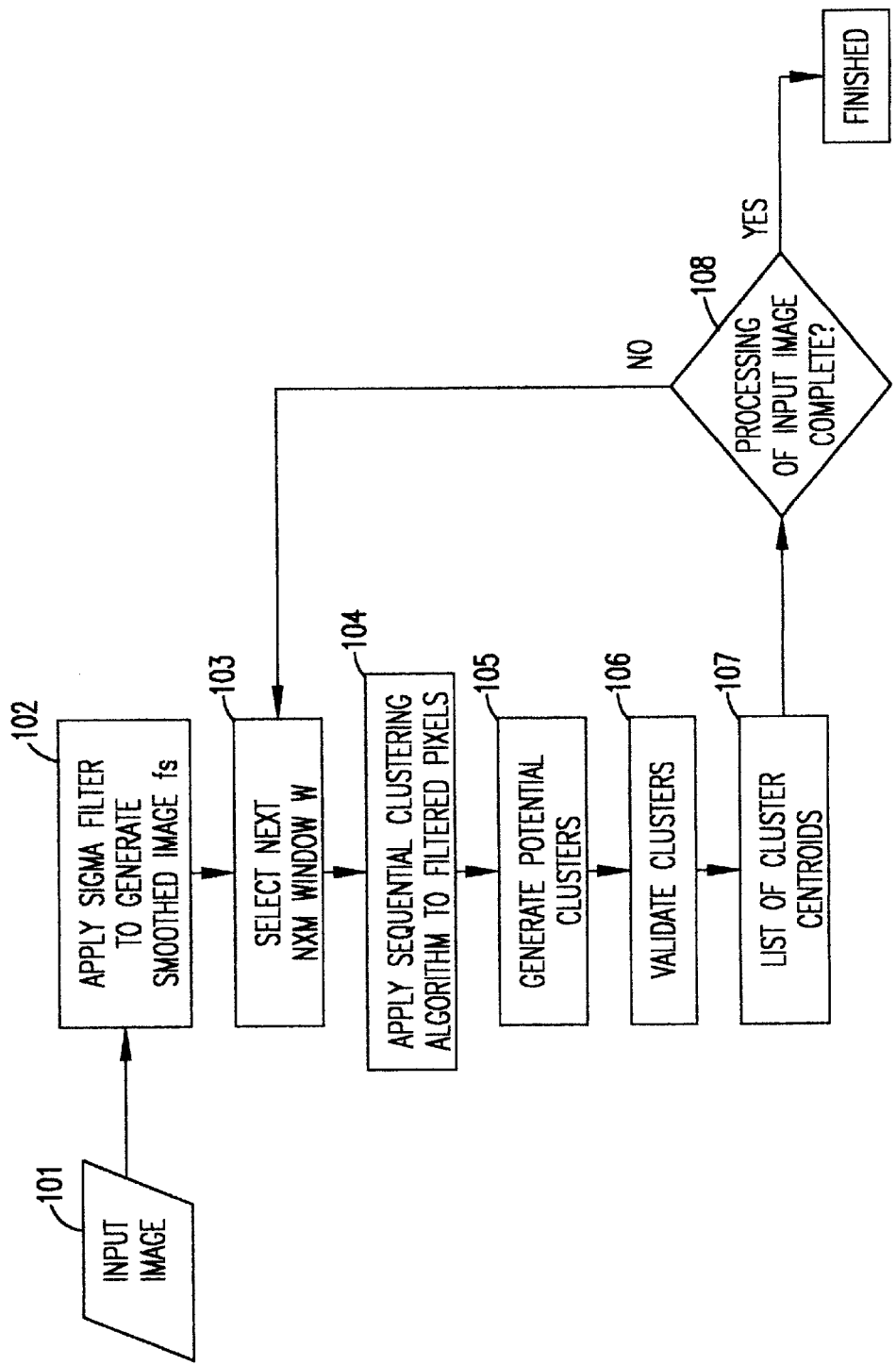
FIG. 1 is a flow diagram showing the steps of the sequential clustering algorithm used to identify the number of clusters present and their centroids in an input image.

FIG. 1 shows a flowchart describing the processing steps used in this algorithm. Note that we use a "divide-and-conquer" strategy in our approach. If we choose to identify the number of color clusters present in the entire image, this turns out to be a very complex task, as several color distributions may be merged together. However, if we choose a smaller local area, such as a 128×128 window, the color cluster analysis becomes simpler, and usually a small number of clusters is present.

The input image, $f$, is input at input block 101 and is first subjected to a sigma filtering operation in function block 102 to produce a smoothed image, $f_s$. The sigma filtering operation is described in more detail in the next section. The sigma filtered image $f_s$ is divided into non-overlapping n×m windows in function block 103. In the preferred embodiment, these windows are of size 128×128 pixels. The size of the windows is not a crucial factor in our algorithm, and other sizes such as 64×64, 100×100, etc., can also be used. The pixels within each n×m window, W, are then subject to a sequential clustering algorithm in function block 104. This results in the identification of potential clusters in the image in function block 105. These potential clusters are subject to a validation stage in function block 106 which rejects clusters which are too small or those clusters representing pixels on the boundaries of text characters. The final result output in function block 107 is a list of cluster centroids in the chosen color space, say RGB (red, green, blue) values and the number of pixels within each cluster. A test is then made in decision block 108 to determine if processing of the input image is complete. If not, the process loops back to function block 103 to repeat the process until the entire image has been covered.

Figure 2:
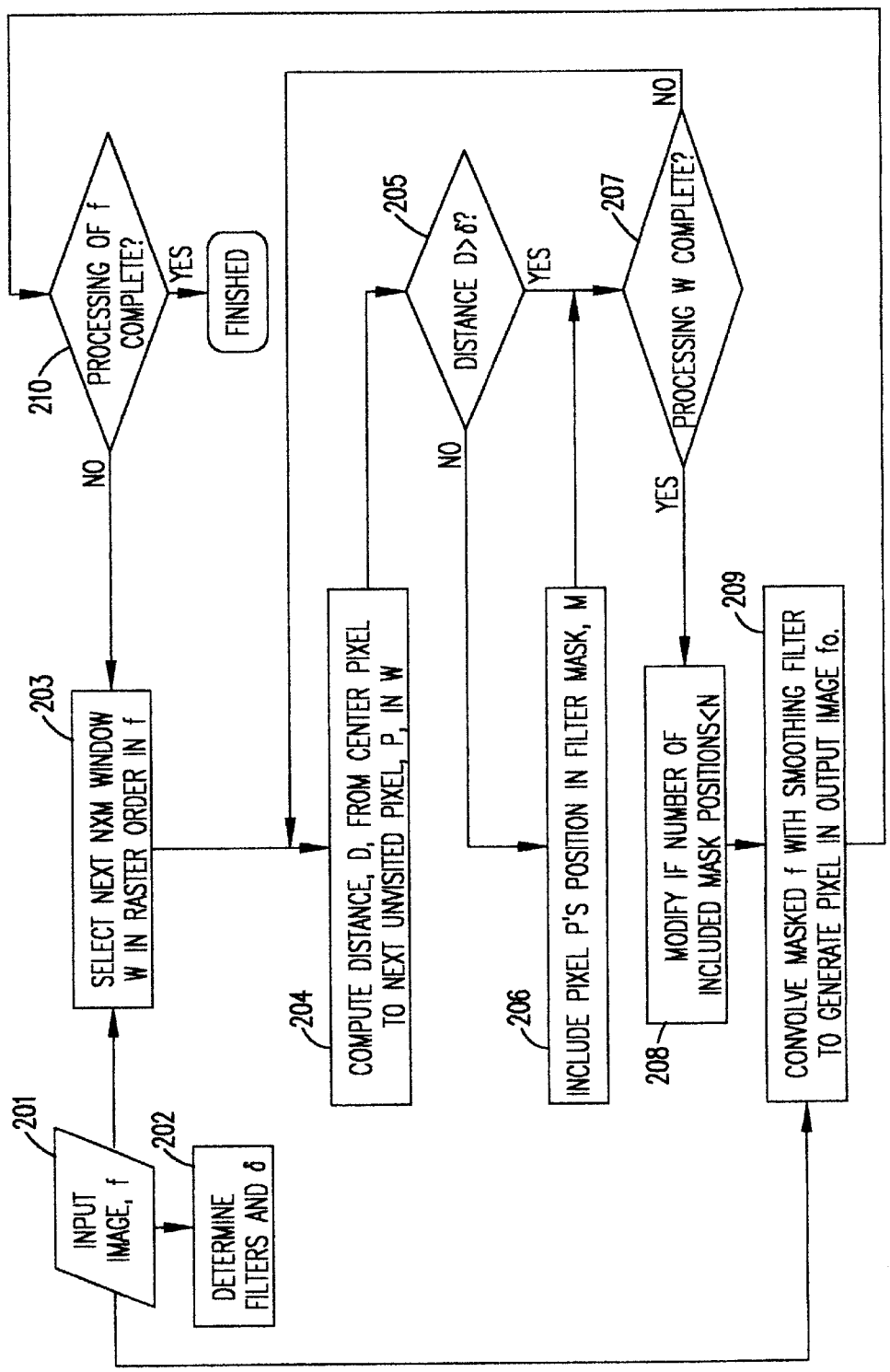
FIG. 2 is a flow diagram showing the steps of a smoothing operation using a sigma filter which is performed before the clustering operation.

The sigma filtering operations of function block 102 are now described. Before we perform the clustering operation described above, we apply a smoothing operation using a sigma filter as shown in FIG. 2. A sigma filter is based on a model of an image over a local area as a summation of a constant, k, and a noise component n(x,y). (For the time being, we assume that the window does not contain edges or sharp transitions). We can approximate noise as a Gaussian distribution, which is completely characterized by its mean, $\mu$, and standard deviation $\sigma$. It can be shown that, for a Gaussian distribution, 95% of the population is located within $2\sigma$ of the mean. This implies that 95% of the pixel values (e.g., a color value in terms of a RGB space) in the window are located within $2\sigma$ of the mean, $\mu$. The "mean" refers to the average of the color values of the pixels in the window. In conventional smoothing operations, all the pixels within a given window are used in the operation. However, the sigma filter identifies those pixels that belong to the same class as the center pixel, based on the above statistics for a Gaussian distribution. Only these pixels are used to perform smoothing, as will be described in more detail in FIG. 4. We now present techniques for estimating the mean and filter parameter $\sigma$.

From the image $f$ input in input block 201, we estimate a threshold value $\delta$ as $\delta=2\sigma$. In accordance with one embodiment of the invention, this threshold value is estimated by first locating edge points in the image $f$ which can be done using operators such as the Canny edge operator or the Sobel edge operator, known to those familiar with the state of the art. We then calculate the local standard deviation $\delta_n$ in terms of color (RGB) values for pixels surrounding each edge point, say within an N×M window centered on the edge point, e.g., a 7×7 window. (In the symbol $\delta_n$, the n indexes the edge points.) This process is repeated for each edge point in the image $f$. The sequence of standard deviations $\{\delta_n\}$ for all edge points is then sorted and $\delta$ is calculated by the following rule:

$$\delta = \min\{\delta_i | \delta_i \geq 0.1 \times \max\{\delta_i\}\}$$

This rule captures the statistics of regions that surround edge pixels in the image so that smoothing across edges can be subsequently avoided. The processing steps just described constitute the process of function block 202 in FIG. 2.

Figure 5B:
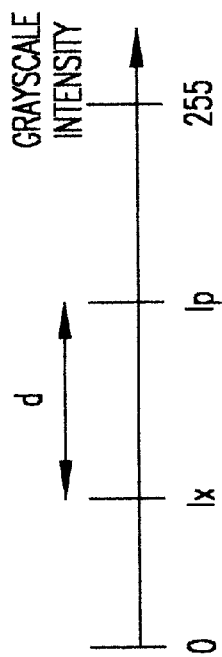
FIGS. 5B and 5C are graphs respectively showing gray scale and color intensities.

The order of processing pixels in the original image is shown in FIG. 3A. An n×m window in function block 203 is moved from one pixel to the next in raster order, as shown in FIGS. 3B and 3C. For specificity, a 7×7 window is illustrated in FIGS. 3B and 3C. The elements within the n×m window are scanned in the same raster order as shown in FIG. 3A. As the window is scanned, the sigma filter identifies those pixels in image $f$ input at input block 201 which are within $2\sigma$ of the value of the center pixel of the window. Let I denote the interval within $2\sigma$ of the value of the center pixel of the window. (For computational efficiency, we assume that the mean value and center pixel value are interchangeable.) In the one-dimensional case, involving grayscale images, this interval is represented by a line segment as shown in FIG. 5B. In the three-dimensional case, involving RGB values, this interval is generalized to a sphere centered at the mean.

Figure 4:
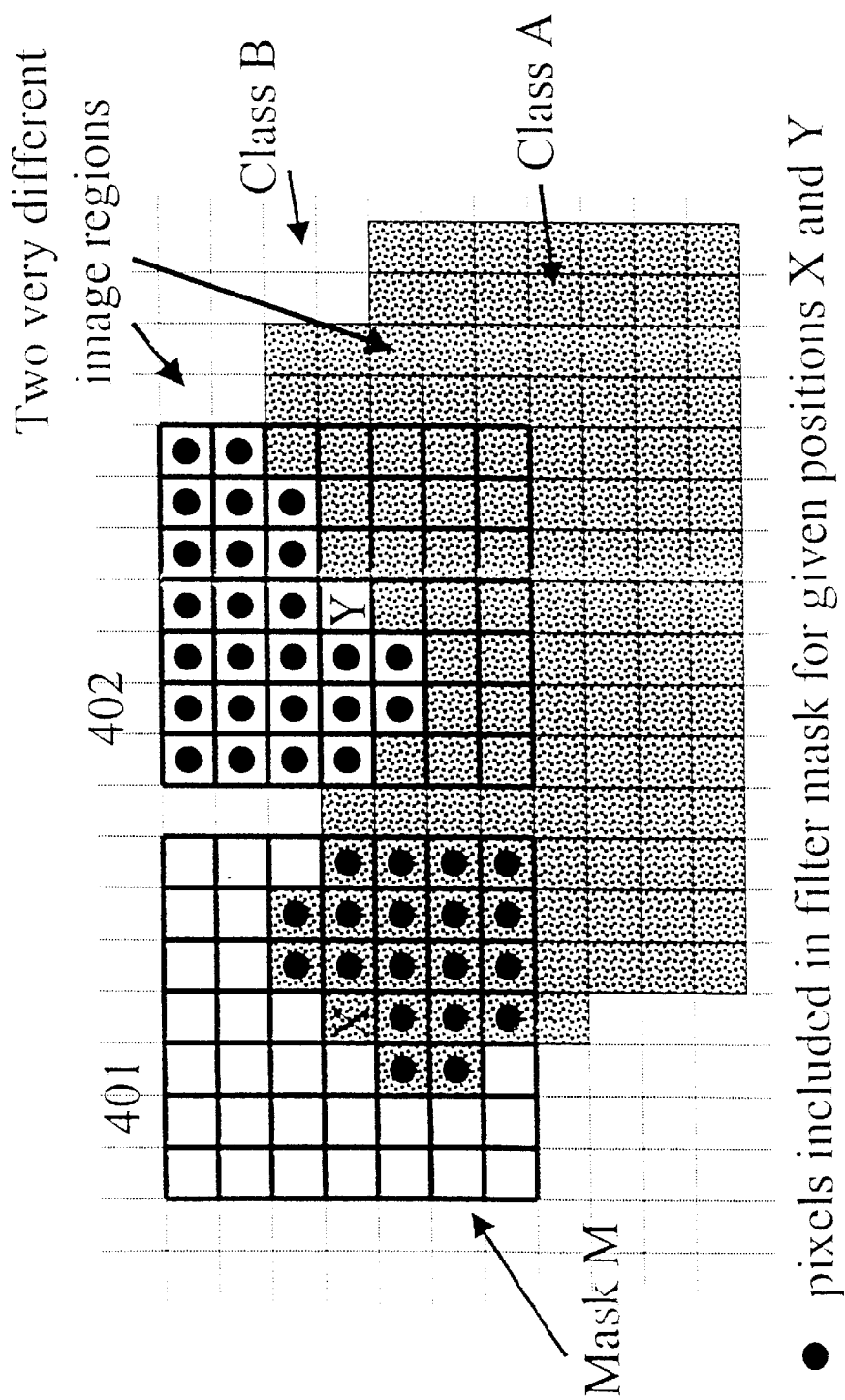
FIG. 4 is a diagram showing the center pixel of a 7×7 window positioned over regions of different characteristics.
Figure 5C:
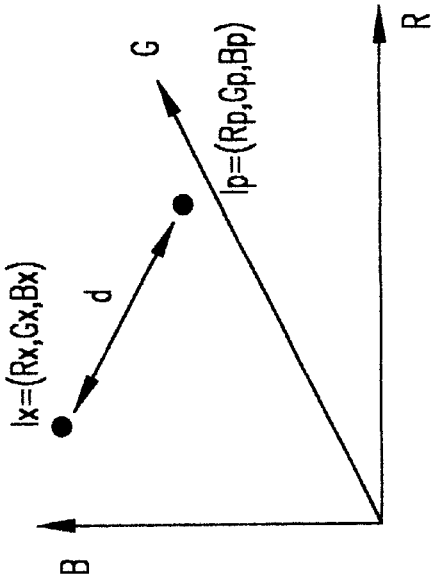
Figure 5A:
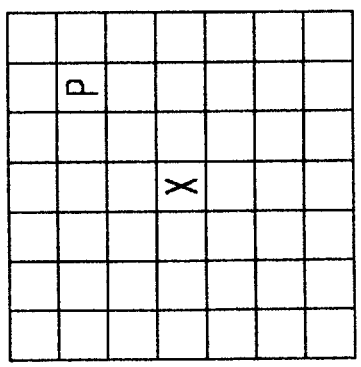
FIG. 5A is a diagram showing a 7×7 window with pixel p.

The pixels outside of this $2\sigma$ range are considered outliers, and the pixels that are within this range are considered to belong to the same class as the center pixel. This concept is illustrated in FIG. 4, which shows the center pixel of a 7×7 window positioned over regions of different characteristics. For the sake of simplicity, we consider regions, denoted by class A and class B, which represent regions with widely differing colors. In 401, the center pixel X of the 7×7 window is positioned on a class A pixel. Hence, the sigma filter includes those pixels within the 7×7 window that are in class A, and excludes pixels belonging to class B, which are considered to be outliers. In order to implement this concept, we compute the distance, d, from the center pixel in the window to a next unvisited pixel, p, in function block 204. This distance is measured in terms of a RGB color space difference between the unvisited pixel and the center pixel within the window, as shown in FIG. 5C.

In the next step in function block 205, it is determined whether the computed distance d is greater than the threshold value ($2\sigma$). If not, the pixel position of the unvisited pixel p is included in a filter mask, M, in function block 206. The filter mask M has a value of "1" to mark an included pixel and "0" otherwise.

The result of this operation is to produce a mask M, which marks the positions of the pixels of image $f$ input in input block 201 that belong to the same class as the center pixel. These positions are denoted by the black dots in mask, M, as shown in FIG. 4. Similarly, in 402, the center pixel Y of the 7×7 window is positioned on a class B pixel. Hence, the sigma filter includes those pixels within the 7×7 window that are in class B, and excludes pixels belonging to class A, which are considered to be outliers. The result of this operation is to produce another mask.

A determination is made in decision block 207 as to whether the processing of the window is complete. If not, the process loops back to function block 204; otherwise, a modification is made in function block 208 if the number of included mask positions is less than N. The number of non-zero elements in the mask is counted. If this number is less than $N = (\lceil 1.5\sigma \rceil)+1$, then the center pixel is replaced by the mean of its surrounding pixels (say within a 3×3 window) and processing resumes at function block 209 with the new value for the center pixel. The reason for this step is that the image may contain impulse noise, and few pixels will be close in value to a noisy center pixel. In such a case, the noisy center pixel is replaced as described. Then a test is made in decision block 210 to determine if the processing of the image $f$ is complete. If not, the process loops back to function block 203 to continue the process until processing is complete.

An element of mask M can contain one of two values, 0 or 1, with a "1" denoting an element that belongs to the same class as the center pixel, and "0" denoting an element that belongs to a different class. Each element of the mask is then multiplied by the coefficients of a smoothing filter such as a Gaussian, shown in the table of FIG. 6, to generate a resulting filter kernel. The resulting filter kernel is then applied to pixels of $f$ within the given n×m window. The construction of this filter kernel ensures that pixels within similar classes are smoothed, and pixels belonging to disparate classes are ignored. As a result, the sigma filter generates a smooth image with preserved edge information.

Figure 7:
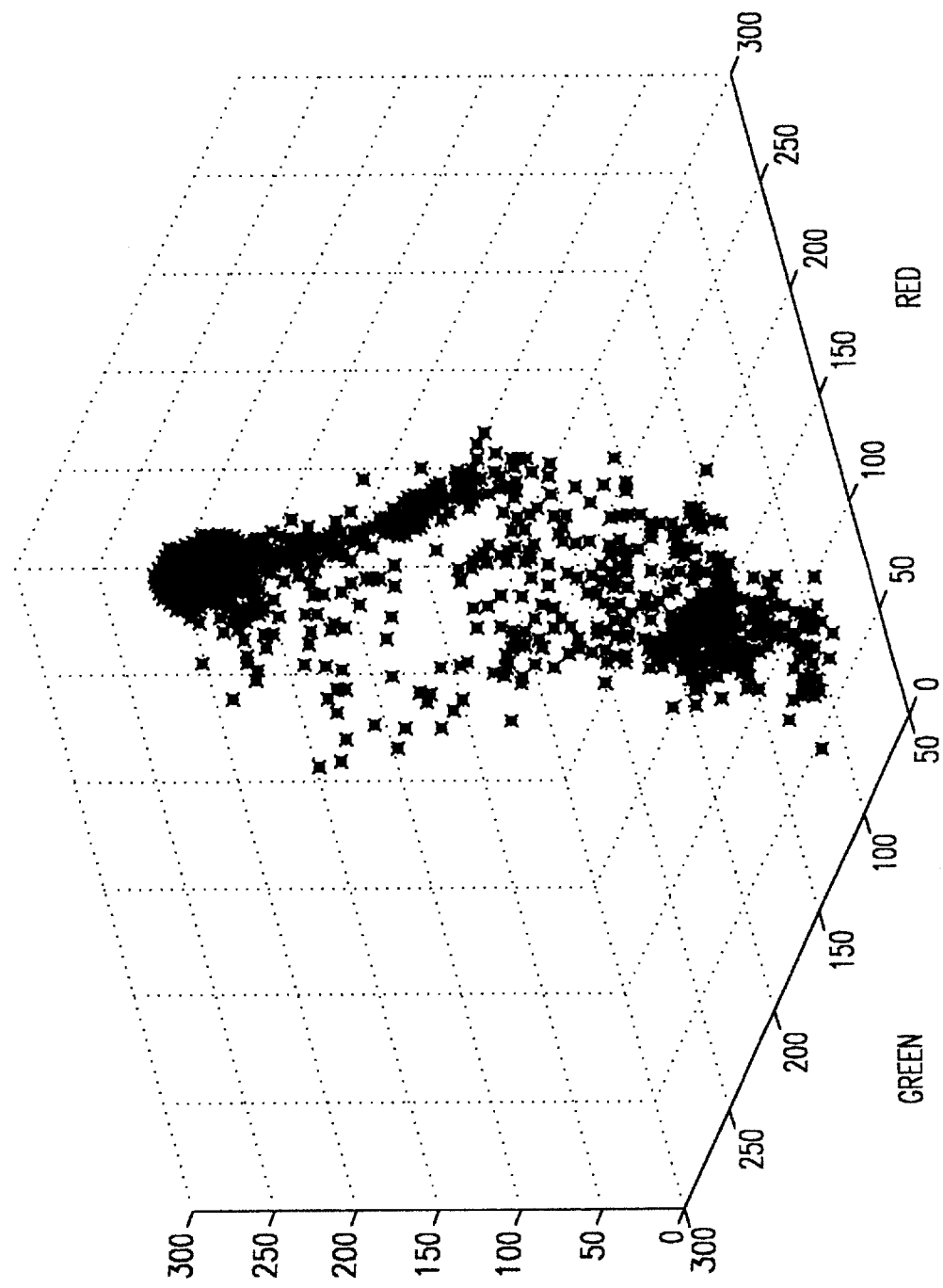
FIG. 7 is a three-dimensional scatter plot of RGB values showing the distribution of RGB values within a local 128×128 region of an image.
Figure 8:
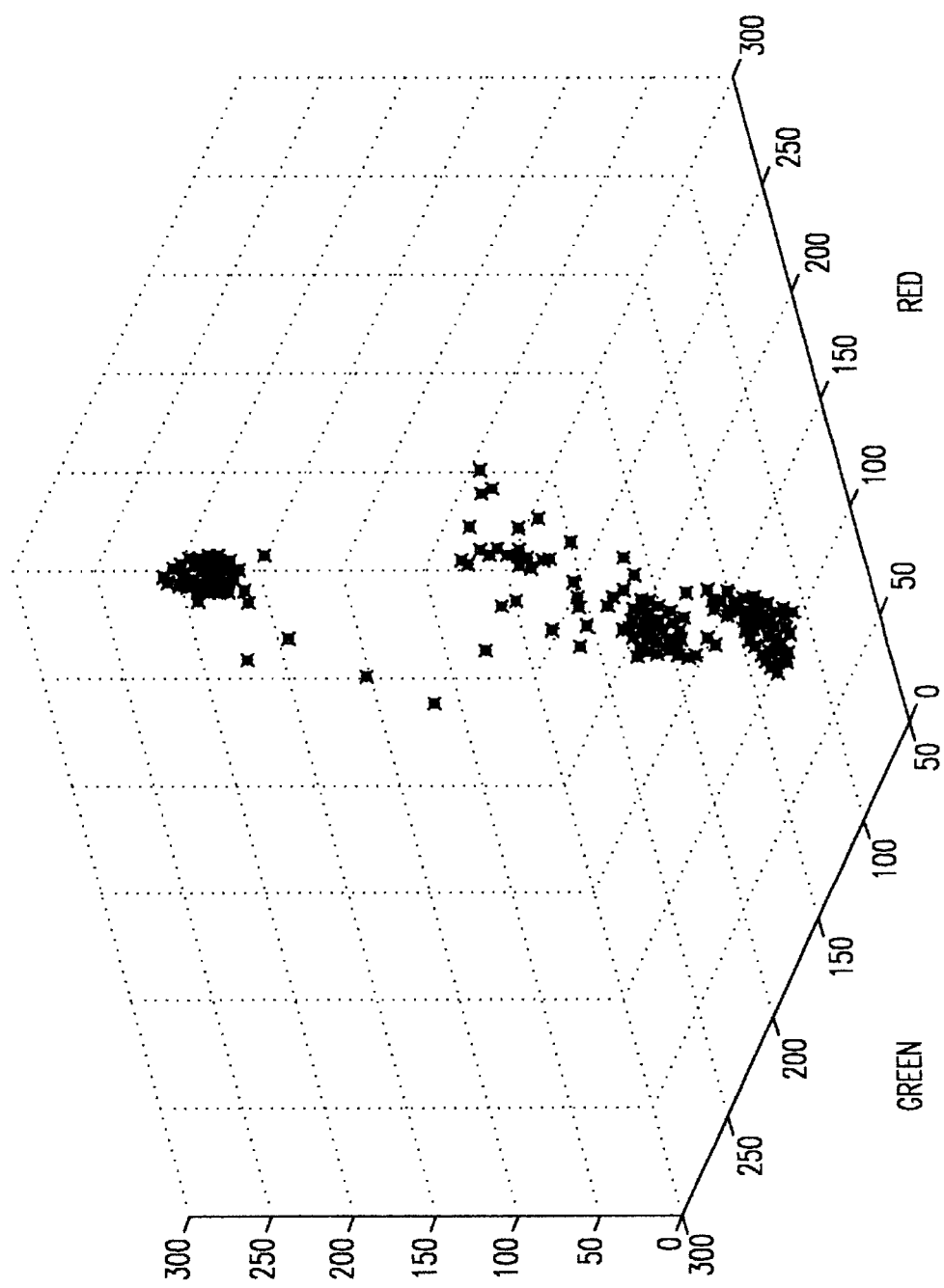
FIG. 8 is a three-dimensional scatter plot showing the distribution of RGB values in the 128×128 image window is shown after sigma filtering.

The beneficial effects of applying this sigma filtering are illustrated in FIGS. 7 and 8. FIG. 7 shows a scatter plot of RGB values, which represents the distribution of RGB values within a local 128×128 region of an image. FIG. 8 shows the scatter plot of RGB values after the pixels in this region have been smoothed using a sigma filter. Note that the clusters present have become more compact. Ordinarily, conventional smoothing will not produce such a result as conventional smoothing may generate additional clusters. Hence the use of a sigma filtering stage before clustering is very advantageous.

Sequential clustering algorithms are described in the literature, for instance in *Pattern Recognition* by S. Theodoridis and K. Koutroumbas, Academic Press, 1999, pp. 387–392. The essential idea in sequential clustering is that each input data point is either assigned to an already-created cluster, or a new one is created. The processing steps used in sequential clustering are as follows.

Let $\{x_1, \ldots, x_n\}$ constitute the set of data points that we wish to cluster. The point $x_1$ in our case is defined as a triplet of RGB values, say R=20, G=30, B=15. The objective of the clustering algorithm is to create a set of m cluster centroids $\{C_1, C_2, \ldots, C_m\}$. Let $d(x, C)$ denote the distance between point x and cluster centroid C. In this invention, we use the Euclidean distance in RGB color space between the two points. Other distance measures such as the city-block distance can also be used.

Figure 9:
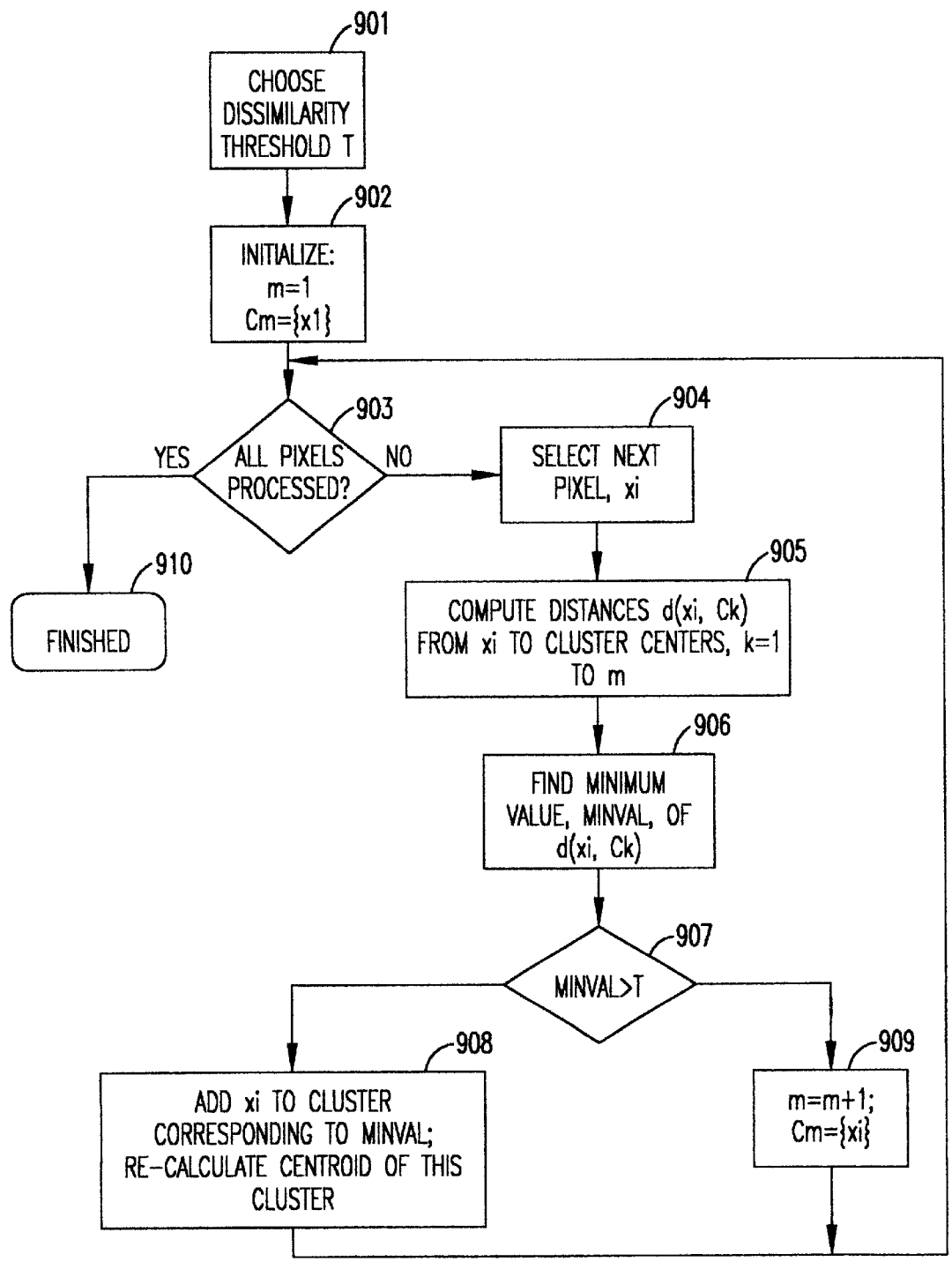
FIG. 9 is a flow diagram showing the steps of the sequential clustering algorithm.

The sequential clustering algorithm we use is described in a flowchart in FIG. 9. First we select a threshold, T, in function block 901. This threshold denotes the threshold of dissimilarity. An initialization process takes place in function block 902. The first data point, $x_1$, is assigned to the first cluster. Thus, $C_1=x_1$, i.e., the first point is made the first cluster's centroid. The number of clusters will be denoted by the index m.

Then we enter a processing decision block 903 where we loop over all the remaining points while performing the following computations. In function block 904, the next pixel $x_i$ is selected. In function block 905, the distances $d(x_i, C_k)$ are computed for values of k ranging from 1 to m. The minimum value, minval, of the distances $d(x_i, C_k)$ is found in function block 906. The minval is tested in decision block 907 to determine if it is greater than T. If minval is greater than T, a new cluster, $C_m$, is formed in function block 909 and the point, $x_i$, is assigned to this cluster. If minval is less than or equal to T, we add $x_i$ to the cluster corresponding to minval in function block 908, and the centroid for this cluster is then recalculated.

A refinement stage can be used to merge clusters that may be closely located. This stage calculates the distance between two clusters and merges them as described on page 395 of *Pattern Recognition* by S. Theodoridis and K. Koutroumbas, Academic Press, 1999.

The threshold, T, is a criterion to separate one cluster from another. In the process of estimating parameters used in sigma filtering, we computed the measure of the dissimilarity between disparate regions. This measure was denoted by $\delta$. Since threshold T is also a measure of dissimilarity, we can make this proportional to $\delta$. In the preferred embodiment, we choose T=1.18$\delta$. This choice of T is based on the observation that two identical Gaussian functions are resolvable if they are greater than 1.18×(2 standard deviations) apart. Other choices for the value of T are also possible.

The next step is to validate the clusters thus determined. The identified clusters should preferably be compact and of significant size. By compactness we mean that the cluster is not spread over a large volume in the feature space, RGB values in our case. One measure of compactness is to calculate the ratio of the distance of the $20^{th}$ furthest pixel from the cluster centroid to the average distance of pixels from the cluster centroid. If the cluster is compact, then this ratio is small, say less than 1. The size of the cluster can be measured relative to the number of points in the n×m window. So if the number of points in the cluster is less than say 5% of the number of points in the n×m window, the cluster is deemed to be insignificant.

A final case must be considered, which occurs at pixels around edges of characters. Usually there is a color fringing effect that takes place during printing and scanning, such that the color of the foreground bleeds into the background. Due to this effect, the pixels along edges of characters will have a different color, and show up as a separate cluster. In order to identify such clusters, we perform an operation called erosion, on the binary image that corresponds to the clusters that are insignificant or non-compact. Erosion is a well known operator in the image processing field and should be known to practitioners of the art. If the cluster disappears after the application of the erosion operator, or is greatly diminished, we know this cluster corresponds to fringes around characters. Then this cluster can be merged with the nearest cluster. This completes the step of cluster validation, block 106. Those familiar with the art will recognize that similar methods for cluster validation can be employed with the same results.

The identification of the clusters completes the segmentation process. We give all the members of a cluster a common label, and each separate cluster is given a unique label. The members of a cluster can then be assigned the same color value as the centroid of the cluster, thus facilitating color compression.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A fast method of image segmentation that retains edge information comprising the steps of:

applying a sigma filter to generate a smoothed image;

dividing the filtered image into a plurality of non-overlapping windows;

applying a sequential clustering algorithm to filtered pixels of each window to generate potential clusters;

validating generated potential clusters while rejecting clusters representing pixels on boundaries; and generating a list of cluster centroids in a chosen color space; wherein the step of applying a sigma filter comprises the steps of:

estimating a threshold value as 2σ;

computing a distance, d, from the center pixel in the window in image $f$ to a next unvisited pixel, p, this distance being measured in terms of a RGB (red, green, blue) color space difference between the unvisited pixel p in a filter mask, M, the filter mask M having a value of "1" to mark an included pixel and "0" otherwise; and determining whether processing of the window is complete and, if not, repeating the steps of computing a distance, d, and determining whether a computed distance d is greater than the threshold value.

2. The fast method of image segmentation recited in claim 1, wherein the sigma filter is based on a model of an image over a local area as a summation of a constant, k, and a noise component, n(x,y), wherein the noise is approximated as a Gaussian distribution, which is completely characterized by its mean, $\mu$, and standard deviation, σ, and that, for a Gaussian distribution, 95% of pixel values in a window are located within 2σ of the mean, $\mu$, where the "mean" refers to an average of color values within a window, The sigma filter identifying those pixels that belong to a same class as a center pixel of the window.

3. A fast method of image segmentation that retains edge information comprising the steps of:

applying a sigma filter to generate a smoothed image;

dividing the filtered image into a plurality of non-overlapping windows;

applying a sequential clustering algorithm to filtered pixels of each window to generate potential clusters;

validating generated potential clusters while rejecting clusters representing pixels on boundaries; and generating a list of cluster centroids in a chosen color space; wherein the step of applying a sigma filter comprises the steps of:

estimating a threshold value;

computing a distance, d, from the center pixel in the window in image $f$ to a next unvisited pixel, p;

determining whether a computed distance d is greater than the threshold value and if not, including the pixel position of the unvisited pixel p in a filter mask, M, the filter mask M having a value of "1" to mark an included pixel and "0" otherwise; and determining whether processing of the window is complete and, if not, repeating the steps of computing a distance, d, and determining whether a computed distance d is greater than the threshold value.

4. The fast method of image segmentation recited in claim 3, wherein the step of applying a sigma filter comprises the steps of:

modifying the window if the number or included mask positions is significantly less than the number of pixels within the window by replacing the center pixel by the mean of its surrounding pixels; and processing with the new value for the center pixel.

5. The fast method of image segmentation recited in claim 3, wherein the step of applying a sigma filter further comprises the steps of:

modifying the window if the number of included mask positions is less than N, where $N=(\lceil 1.5\sigma \rceil)+1$, by replacing the center pixel by the mean of its surrounding pixels; and processing with the new value for the center pixel.

6. The fast method of image segmentation recited in claim 3, wherein the step of estimating a threshold value comprises the steps of:

locating edge points in the image $f$;

calculating a local standard deviation $\delta_n$ in terms of color (RGB) values for pixels surrounding each edge point, where n indexes the edge points, and repeating this process for each edge point in an image $f$;

sorting a sequence of standard deviations $\{\delta_n\}$ for all edge points; and calculating δ by the following rule:

$$\delta = \min\{\delta_i | \delta_i \geq 0.1 \times \max\{\delta_i\}\}$$

to capture statistics of regions that surround edge pixels in the image so that smoothing across edges can be subsequently avoided.

7. The fast method of image segmentation recited in claim 3, wherein the sigma filter is based on a model of an image over a local area as a summation of a constant, k, and a noise component, n(x,y), wherein the noise is approximated as a Gaussian distribution, which is completely characterized by its mean, $\mu$, and standard deviation, σ, and that, for a Gaussian distribution, 95% of pixel values in a window are located within 2σ of the mean, $\mu$, where the "mean" refers to an average of color values within a window, The sigma filter identifying those pixels that belong to a same class as a center pixel of the window.

\* \* \* \* \*